United States Patent [19]

Bert et al.

[11] Patent Number: 4,517,943
[45] Date of Patent: May 21, 1985

[54] DYNAMIC METHODS AND APPARATUS FOR REDUCING OCTANE REQUIREMENT INCREASE

[75] Inventors: Jack A. Bert, Kensington; R. Eric Olsen, Alameda, both of Calif.

[73] Assignee: Chevron Research Company, San Francisco, Calif.

[21] Appl. No.: 514,229

[22] Filed: Jul. 15, 1983

[51] Int. Cl.³ ............................................. F02P 5/04
[52] U.S. Cl. .............................. 123/415; 123/198 A
[58] Field of Search ................. 123/415, 425, 198 A, 123/406

[56] References Cited

U.S. PATENT DOCUMENTS 3,903,856  9/1975  McDougal et al. ................. 123/425

Primary Examiner—Tony M. Argenbright
Attorney, Agent, or Firm—Lewis S. Gruber; Edward J. Keeling

[57] ABSTRACT

Methods and apparatus for removing combustion chamber deposits during normal engine operation by advancing spark timing during intermittent series of compression strokes for each cylinder of a spark-ignition, internal-combustion engine in turn.

6 Claims, 5 Drawing Figures

FIG_2

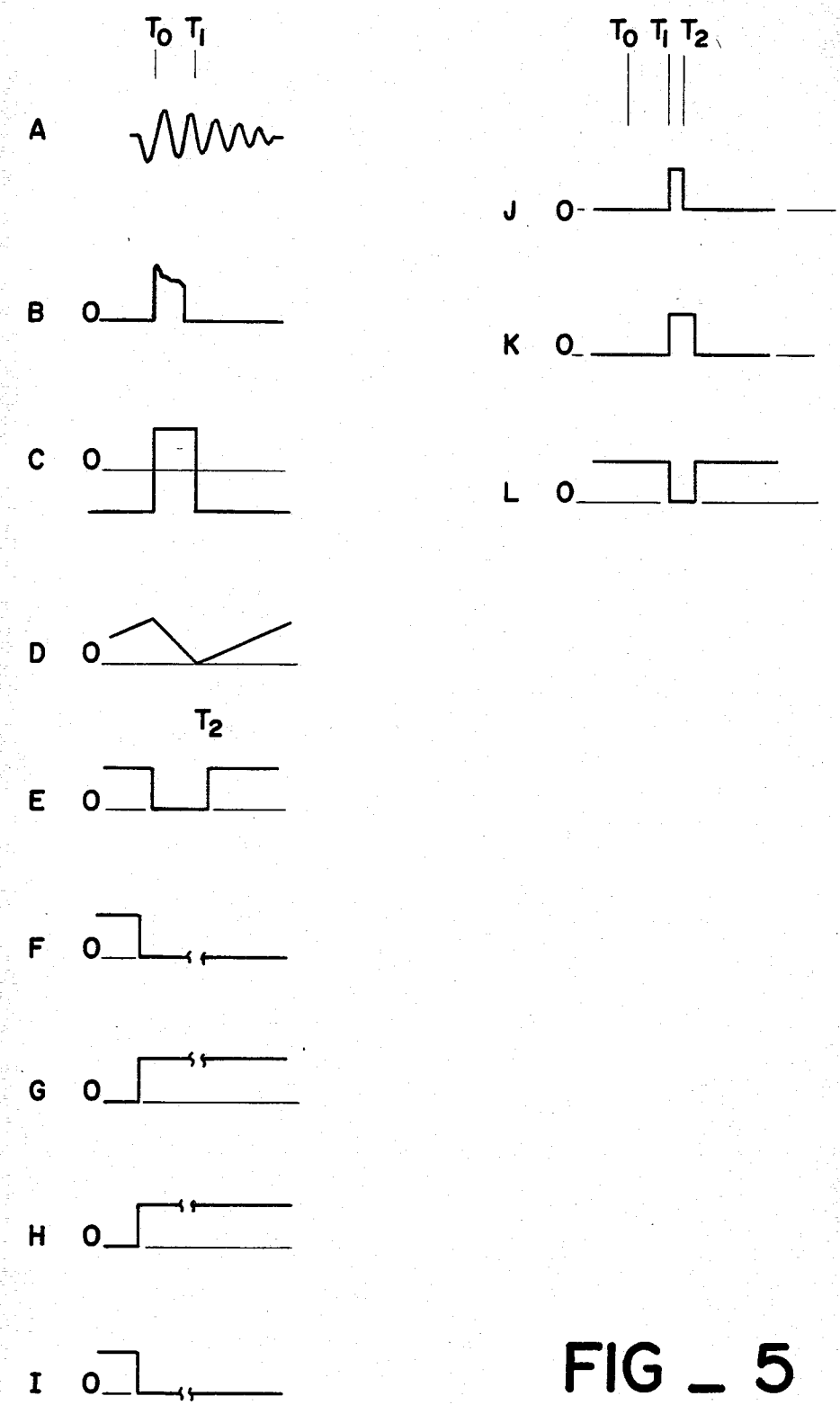
FIG_5

DYNAMIC METHODS AND APPARATUS FOR REDUCING OCTANE REQUIREMENT INCREASE

BACKGROUND OF THE INVENTION

The present invention pertains in general to methods and apparatus for removing deposits from combustion chambers of an internal-combustion engine and, in particular, to methods and apparatus for reducing and maintaining combustion chamber deposits at a low level in an internal-combustion engine while the engine is in normal use.

During operation of a spark-ignition, internal-combustion engine, deposits accumulate within the combustion chambers of the engine. In the presence of these deposits, it may be necessary to supply the engine with a fuel having a higher octane number than is required in the absence of these deposits in order to avoid objectionable knock. This octane requirement increase is often abbreviated "ORI". Due to the relatively high production cost associated with fuels havng high octane numbers, it is desirable to reduce ORI as much as possible.

An example of the use of chemically-induced knock to remove deposits may be found in U.S. Pat. No. 3,038,454. In this technique, a pro-knock or detonant material in the form of a vapor is applied to the air stream ahead of a carburetor while the engine is running at idle speed or partially open throttle. Although deposits are removed, knock intensity must be monitored with extreme care in order to avoid engine damage. For optimum results, this procedure is performed by a trained mechanic. In addition, the heavy knock produced and the requirement for a knock-inducing chemical determine that an automobile undergoing chemically-induced knock ignition treatment cannot be used for normal driving while the procedure is being performed.

In order to maintain optimal power output and fuel economy, ignition systems generally provide for a speed-dependent advance and a manifold pressure-dependent advance in spark timing. Along with a basic spark-timing advance, the speed and manifold pressure advances may be identified by the term "normal spark-timing advance".

U.S. Pat. No. 2,843,645 and No. 2,833,842, assigned to the assignee of the present invention, illustrate methods and apparatus for advancing spark timing beyond the normal spark-timing advance for the purpose of removing combustion chamber deposits by a process known as "purge ignition". During purge ignition, the spark timing is advanced for all cylinders simultaneously. This procedure is applied while the vehicle remains standing still. A trained mechanic must be employed to advance the spark timing and to retime the engine at the end of the procedure. The spark timing is uninteruptedly advanced in all cylinders for the duration of the procedure. Large clouds of black exhaust are produced.

Therefore, a need exists for a method for reducing ORI which does not require removing an automobile from normal use or the employment of a trained mechanic. Furthermore, it is highly desirable to have a technique not only for reducing any build-up of combustion chamber deposits, but also for maintaining such deposits at a relatively low level. With the increasing availability of low-cost, integrated automotive electronics, it is also desirable to have an apparatus which is integrable on a chip with these electronics in order to save on weight, space, cost, and complexity.

SUMMARY OF THE INVENTION

Accordingly, it is an object of the present invention to provide a new and improved method for removing combustion chamber deposits from an operating, spark-ignition, internal-combustion engine during regular use.

Another object of the present invention is to provide an apparatus for synchronizing a combustion chamber deposit-removing, spark-timing advance with the normal spark-timing advance.

Among the advantages of the present invention are a reduction in ORI, the relative safety and cleanliness associated with the present invention, and the ability to integrate the apparatus of the present invention on a chip with other automotive electronics. The present invention is also advantageous because it does not require the services of a trained mechanic nor does it require the automobile to be removed from normal use. A further advantage is that the present invention does not require knock-inducing chemicals. Still another advantage of the present invention is that it may be applied during normal operation of an automobile without causing knock.

In order to attain the above-mentioned and other objects and advantages, a method according to the present invention involves removing combustion chamber deposits from an operating, spark-ignition, internal-combustion engine during regular use, in which engine a normal spark-timing advance includes any speed, temperature or manifold vacuum dependent, spark-timing advance. The method comprises the step of intermittently advancing the spark timing beyond the normal spark-timing advance in order to remove combustion chamber deposits.

Another method according to the present invention involves removing combustion chamber deposits in an operating, spark-ignition, internal-combustion engine having a compression stroke wherein a combustible mixture is compressed within the combustion chamber. The method comprises the step of intermittently burning substantially all of the combustible mixture during series of compression strokes.

An apparatus according to the present invention involves synchronizing a combustion chamber deposit-removing, spark-timing advance with a normal spark-timing advance in an operating, spark-ignition, internal-combustion engine during regular use, in which engine the normal spark-timing advance includes any speed or manifold pressure-dependent, spark-timing advance. The apparatus comprises means for selecting conditions appropriate for advancing spark timing and means, coupled to the means for selecting, for intermittently advancing spark timing in the combustion cycles beyond the maximum normal spark-timing advance in order to remove combustion chamber deposits.

BRIEF DESCRIPTION OF THE DRAWINGS

FIG. 5 is a set of representative waveforms present at various points within the embodiment shown in FIG. 4.

DETAILED DESCRIPTION OF THE PREFERRED EMBODIMENT

In a preferred method of carrying out the present invention, spark timing is intermittently advanced beyond the normal spark-timing advance for one combustion chamber at a time during intermittently applied series of combustion cycles. According to the present invention, spark timing is advanced during about 0.1% to about 2% of the total number of combustion cycles depending upon the specific engine, desired fuel economy and desired power output. The range within which spark timing may be advanced according to the present invention extends from about the point 10 degrees before the normal spark-timing advance to about the point just after closing of the intake valve. In the cylinder for which spark timing is advanced, this results in the burning of virtually all of a combustible mixture during a compression stroke. Whether this method removes high levels of combustion chamber deposits and maintains the deposits at relatively low levels by burning them away, or by dislodging them with shock waves, or by any other mechanism, the present invention is not intended to be limited to any particular mechanism of action.

For a first example, the spark timing on a 2.3 liter, Ford, in-line, 4-cylinder, overhead cam, spark-ignition, internal-combustion engine operating at 2200 rpm with 10 in. of mercury of manifold vacuum may be advanced from a normal spark-timing advance of 23 degrees before the top dead center on the compression stroke to about 63 degrees before top dead center on the compression stroke. Preferably, spark timing is advanced during about 1% of the total number of combustion cycles which, at 2200 rpm, amounts to a series of about 11 consecutive compression strokes per minute for each cylinder.

Figure 1:
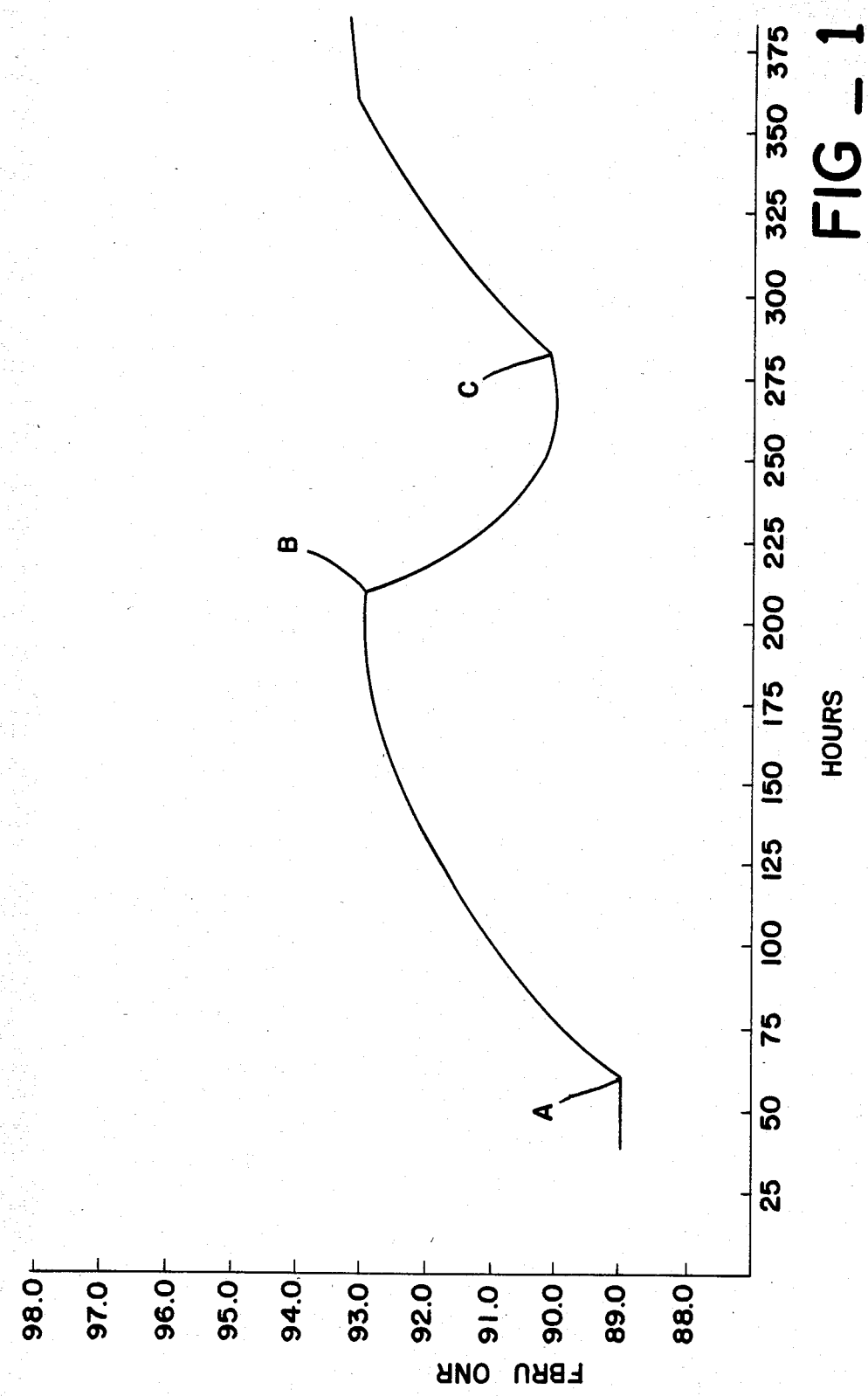
FIG. 1 is a graph illustrating ORI and the use of the present invention to reduce the octane number requirement of an engine.

FIG. 1 graphically illustrates a test of the method of the present invention on the engine of the first example in which a first spark from an auxiliary ignition system is applied to a selected cylinder at 68 degrees before top dead center in advance of a second spark from the regular ignition system. In FIG. 1, the Full Boiling Reference Unleaded Octane Number Requirement (FBRU ONR) is periodically measured at wide open throttle (WOT). This FBRU ONR is plotted as a function of test time, which is accumulated at a constant 40 mph road load condition. At A, a typical fuel is introduced, leading to an ORI of about 4 octane numbers. At B, a clean-up program of approximately 1% spark advance cycles (9 consecutive cycles every 54 seconds) is applied, which stabilizes FBRU ONE after a drop of about 3 octane numbers. At C, the intermittent spark-timing advance is removed and FBRU ONR again increases before stabilizing at about 4 octane numbers above the initial condition. No knock occurs under this condition.

Figure 2:
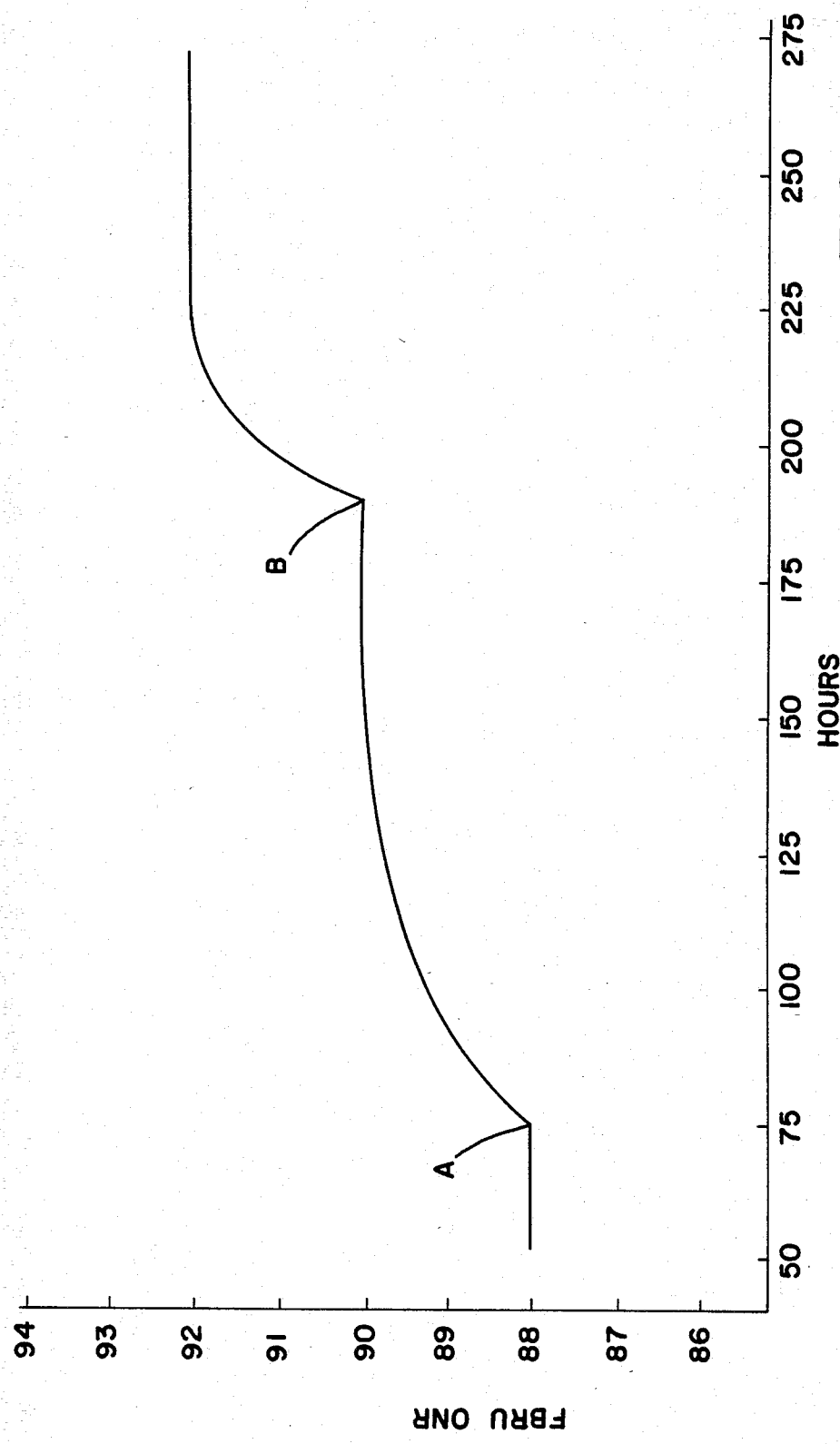
FIG. 2 is a graph illustrating the use of the present invention to maintain the octane number requirement of an engine at a relatively low level.

For a second example, as graphically illustrated in FIG. 2, the present invention may be implemented by employing a program of ½% of intermittent spark-timing advance cycles (about 5 consecutive cycles every 60 seconds) in the same engine used in the first example. Again, the spark timing is advanced 68 degrees by means of an auxiliary ignition system as opposed to a normal spark-timing advance of 23 degrees for the regular ignition system. At 2200 rpm, 40 mph road load conditions and with 10 inches vacuum, the ability of the present invention to maintain low levels of combustion chamber deposits is illustrated in FIG. 2 as follows. At A, a typical fuel and an intermittent spark-timing advance are applied simultaneously. The FBRU ONR is stabilized after an increase of about 2 octane numbers and is maintained at that level for almost 100 hours. At B, the intermittent spark-timing advance is discontinued and FBRU ONR rises another 2 octane numbers before stabilizing.

As the above examples indicate, the present invention is useful not only for cleaning up combustion chamber deposits, as in the first example, but also for maintaining low levels of these deposits, as in the second example. It is clear to one skilled in the art that these two modes are respectively applicable to an engine retrofitted with the apparatus according to the present invention and to a new engine equipped with the apparatus according to the present invention. It is also clear to one skilled in the art that the present invention constitutes a dynamic method for reducing ORI in direct contrast to the existing manually-applied static methods of purge ignition and chemically-induced knock.

Figure 3:
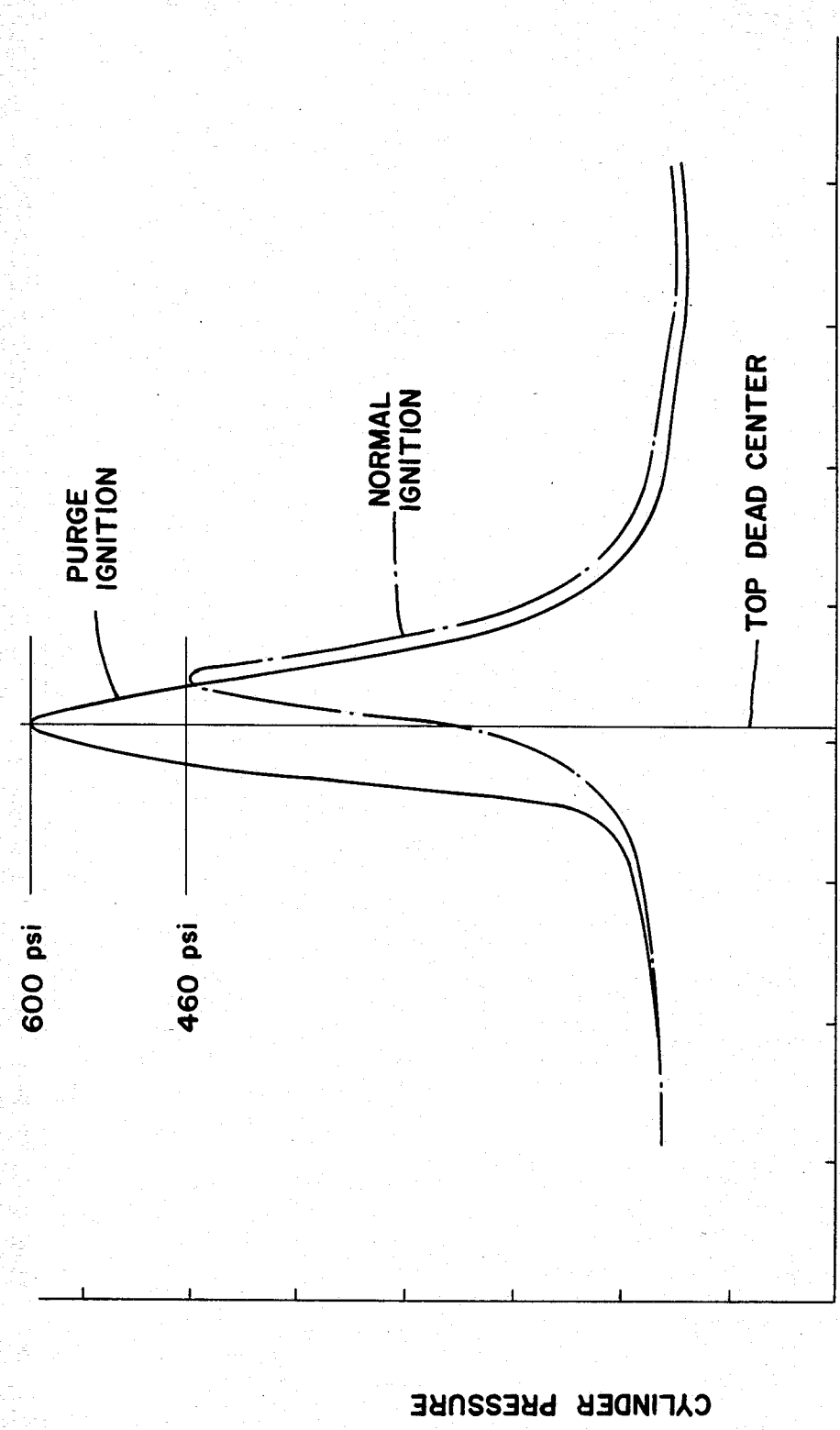
FIG. 3 is a graph illustrating the difference in cylinder pressures attained in the presence and absence of the present invention.

As is illustrated in FIG. 3, a higher-than-normal cylinder pressure is attained when the present invention is used. This higher pressure is accompanied by higher temperature so that deposits may be burned away. The greater the spark advance over the normal spark-timing advance, the less knock is present, and the more time hot, compressed gases are retained within the combustion chamber for the burning of deposits. It is usually desirable to use the largest advance providing reliable ignition in order to maximize deposit removal while eliminating knock. Although optimal advance varies with equipment and driving conditions, up to about 75 degrees of advance is reliable for the equipment operated under the conditions described in the above examples.

Figure 4:
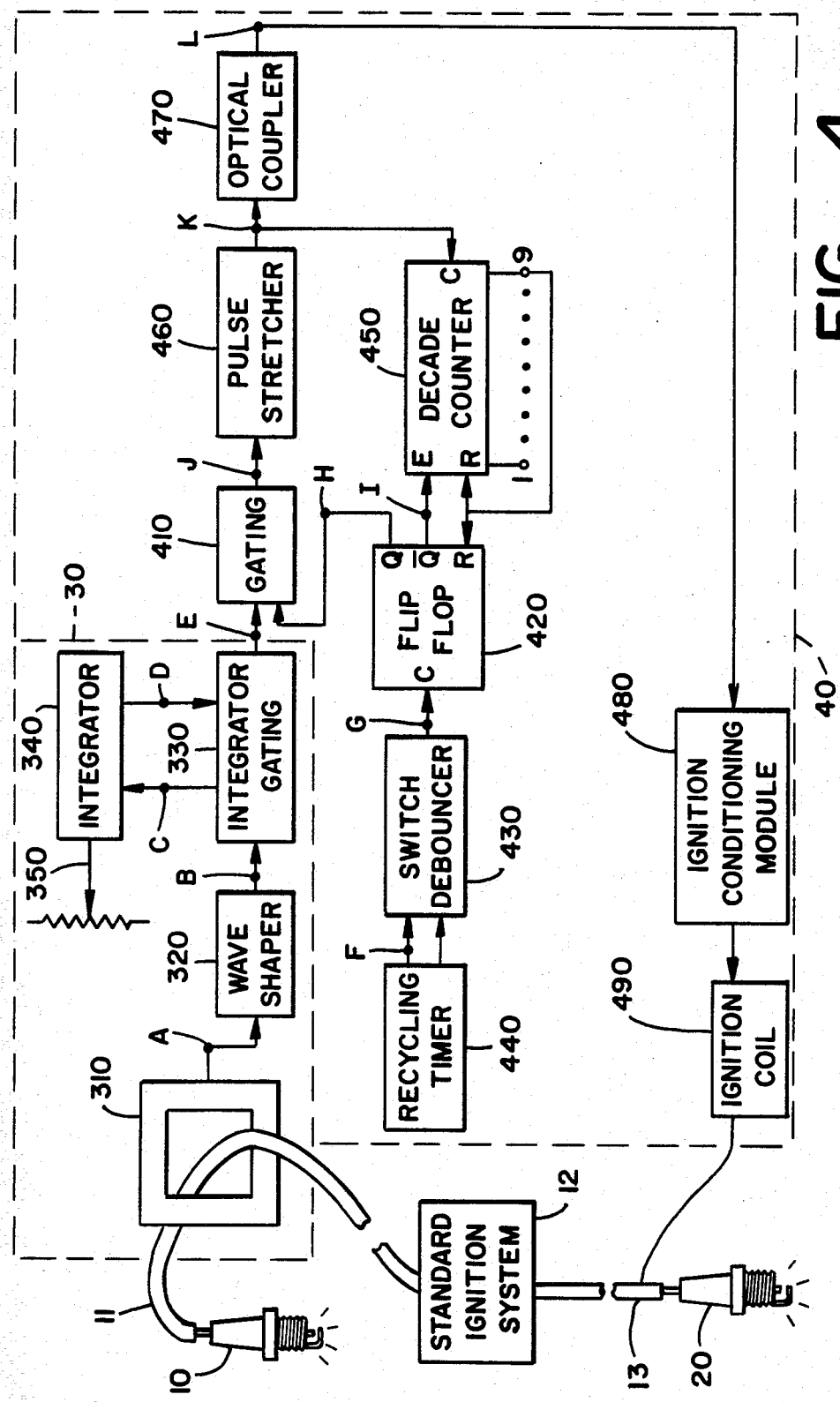
FIG. 4 is a block diagram of a device embodying the present invention.

Apparatus for carring out the method according to the present invention is shown in FIG. 4. A first spark plug 10 and a second spark plug 20, immediately following the spark plug 10 in firing order, are respectively connected to a circuit 30, which selects appropriate conditions for advancing spark timing beyond the normal spark-timing advance, and to a circuit 40, which intermittently advances spark timing beyond the maximum normal spark-timing advance in order to remove combustion chamber deposits.

As is clear to one skilled in the art, the apparatus of FIG. 4 provides an intermittent spark-timing advance only for spark plug 20. However, the system shown in FIG. 4 may be extended to any number of the spark plugs by merely duplicating circuts 30 and 40 for each spark plug to be provided with the system according to the present invention. Furthermore, one skilled in the art understands that although firing order and crank angle (which are respectively important for determining which cylinder is to undergo deposit removal and for timing the intermittent spark advance) are sensed in the apparatus of FIG. 4 by means of an inductive pickup 310, the present invention is not limited thereto but may include a source of information about firing order and crank angle, including information stored within an electronic memory device.

In particular, spark plug 10 is connected by way of a spark plug wire 11 to a standard ignition system 12. Inductive pickup 310 within circuit 30 is coupled to wire 11. A wave shaper 320 is connected to pickup 310 at a node A. An integrator gating circuit 330 is connected to wave shaper 320 at a node B. An integrator 340 has a first input connected to integrator gating circuit 330 at a node C and has a second input connected to a potentiometer 350. An output of integrator 340 is connected at a node D to integrator gating circuit 330.

A gating circuit 410 has an input connected to an output of integrator gating circuit 330 at a node E. An input of gating circuit 410 is connected at a node H to a Q output of a flip-flop 420, which has an input connected at a node G to an output of switch debouncer 430. A first input of switch debouncer 430 is connected by way of a node F to a first output of a recycling timer 440 and a second output of recycling timer 440 is connected to a second input of switch debouncer 430.

A $\overline{Q}$ output of flip-flop 420 is connected at a node I to an enabling input E of decade counter 450. A reset input of decade counter 450 and a reset input of flip-flop 420 are connected to a selected count output of decade counter 450. A clock input C of counter 450 is connected by way of a node K to an output of a pulse stretcher 460, an input of which is coupled at a node J to an output of gating circuit 410. An optical coupler 470 is also connected at node K to the output of pulse stretcher 460 and is connected at a node L to an input of an ignition-conditioning module 480. An output of module 480 is connected to an input of ignition coil 490, while an output of coil 490 is connected to a spark plug wire 13. Wire 13 is in turn connected between spark plug 20 and standard ignition system 12.

Spark plugs, spark plug wires, ignition coils potentiometers, and standard ignition systems are well known and readily available to those skilled in the art and will not be discussed further. Pickup 310 may be an inductive pickup of the sort commnnly used in connection with timing lights. Wave shaper 320 may comprise a precision timer of the sort sold under the Part No. LM2905 by National Semiconductor, Santa Clara, Calif. Gating circuit 330 may comprise two coupled voltage comparators sold under the Part No. LM311 by National Semiconductor, Santa Clara, Calif. Integrator 340 may comprise an operational amplifier sold under the Part No. 741C by National Semiconductor, Santa Clara, Calif.

Gating circuit 410 may comprise coupled NAND gates having the Part No. CD 4011B, flip-flop 420 may comprise a J-K flip-flop having the Part No. CD 4027B, and decade counter 450 may comprise a counter having the Part No. CD 4017B, all available from RCA Corporation, New York, N.Y. Switch debouncer 430 may comprise two NAND gates available under the Part No. 4011B from RCA Corporation, New York, N.Y. Recycling timer 440 is available as an off/on recycling time delay relay from Omnetics Incorporated, Syracruse, N.Y. Optical coupler 470 is available under the Part No. HCPL 3700 from Hewlett-Packard Company, Santa Clara, Calif. Ignition-conditioning module 480 is available under the Part No. 1875990 as an HEI ignition module from General Motors Corporation, Detroit, Mich.

In the operation of the apparatus of FIG. 4, the energization of spark plug 10 along wire 11 is sensed by pickup 310 and transmitted to wave shaper 320 as a signal which may be similar to the idealized waveform shown for node A in FIG. 5, wherein the letters correspond to the nodes in FIG. 4 at which it is theoretically expected that the idealized waveforms of FIG. 5 may be measured. In response to the input from pickup 310, wave shaper 320 provides a pulse as shown at B in FIG. 5. The output signal of wave shaper 320 is used to trigger gating circuit 330 in order to provide a signal like the one shown at C in FIG. 5. In response, integrator 340 integrates from a positive value, set by potentiometer 350, toward zero. This integration determines a delay period that represents the crank angle at which the deposit-removing ignition occurs. For the duration of this integration, the output level of gating circuit 330 through node C is high and the output of circuit 330 through node E is low, providing a first low input to gating circuit 410.

Timer 440 is a dry contact timing device wherein contacts are in one position for a time selected by an operator after which the contacts change to another position for a selected time. Although the use of mechanical contacts is not required by the present invention, where such contacts are present, a switch debouncer, such as device 430, screens out the flutter inherent in such a mechanical switch in order to provide a clear-cut clock input for flip-flop 420. As shown in FIG. 5, when the output of timer 440 connected to node F goes low, the output of debouncer 430 goes high at node G so that flip-flop 420 is clocked in a manner such that its Q and $\overline{Q}$ outputs are toggled. Assuming the Q output of the flip-flop 420 to be initially zero, when the outputs of flip-flop 420 are toggled, the $\overline{Q}$ output goes high, enabling counter 450. The output of gating circuit 410 is only high if both of its inputs are low, so that when the Q output of flip-flop 420 and, consequently, the second input of gating circuit 410, falls low in the presence of a low output from gating circuit 330 through node E, the output of circuit 410 goes high as indicated at J in FIG. 5. The level of th signal at J falls again when the first input to gating circuit 410 goes higher due to a rising output from gating circuit 330 which is the delayed result of the end of the integration of integrator 340.

The output signal from pulse stretcher 460 as shown at K in FIG. 5 is a pulse, the rising edge of which triggers a count in decade counter 450. The output signal from pulse stretcher 460 causes optical coupler 470 to provide an output waveform as shown at L in FIG. 5 which in turn causes spark plug 20 to be energized through ignition-conditioning module 480 and ignition coil 490.

Because the second input of gating circuit 410 is low until flip-flop 420 is reset or clocked, the changing of the first input of gating circuit 410 in response to conductor pickup 310 and integrator 340 causes an ignition pulse to be passed to spark plug 20 at an appropriate time after each firing of spark plug 10. However, each firing of spark plug 10 also causes an output of pulse stretcher 460 to clock decade counter 450 so that when counter 450 counts up to the number corresponding to the output connected to the R input of flip-flop 420 and to the R input of counter 450, flip-flop 420 and counter 450 are both reset. When flip-flop 420 is reset, its outputs toggle and the Q output of flip-flop 420 goes high, blocking any further pulse through gating 410. Timer 440 is set for a much longer period than is necessary to produce the number of pulses counted by decade counter 450 so that no ignition pulses occur until timer 440 again recycles.

Thus, for Example A above, recycling timer 440 is set to have a period of 54 seconds and decade counter 450 is set to count to 9 ( by connecting the reset inputs of elements 420 and 450 with the 9th sequential output of counter 450). In this way, the recycling output of timer 440 determines the interval after which the intermittent spark advance recurs while the number of consecutive advances during one interval are determined by the output of counter 450. As is obvious to one skilled in the art, the present invention is not limited to recycling and decade counters as circuit elements for intermittently advancing spark timing.

While the present inventin has been described in terms of a preferred embodiment, further modifications and improvements will occur to those skilled in the art. For example, the apparatus according to the present invention may comprise a microprocessor-controlled system with a preprogrammed sequence of operations. Furthermore, although a second ignition system may be practical for retrofitting engines with the present invention, it is not required for the operation of the present invention. In automobiles supplied with the present invention as original equipment, intermittent ignition apparatus according to the present invention may be integrated with a conventional ignition system so that structures within the conventional system, such as the coil and apparatus for measuring crank angle, may be used to implement the pressure invention. In addition, ignition systems which may determine spark timing without reference to information regarding crank angle are intended to be within the scope of the present invention.

We desire to be understood, therefore, that this invention is not limited to the particular forms shown and that we intend in the appended claims to cover all such equivalent variations which come within the scope of the invention as claimed.

What is claimed is:

1. A method for removing combustion chamber deposits from an operating, spark-ignition, internal combustion engine during regular use, in which engine a normal spark-timing advance includes any speed, temperature or manifold vacuum dependent, spark-timing advance, comprising the steps of:
    selecting conditions suitable for intermittently advancing spark timing in a cylinder within the range from about 0.1% to about 2% of combustion cycles in said cylinder; and
    intermittently advancing spark timing beyond the normal spark-timing advance according to said selecting step in order to remove combustion chamber deposits.

2. The method as recited in claim 1 wherein said intermittently advancing step is performed in less than all cylinders of the engine at a time.

3. The method as recited in claim 2 wherein each combustion chamber includes an intake valve and wherein the spark timing is intermittently advanced between the point about 10 degrees before the normal spark-timing advance and the point just after closing of the intake valve.

4. The method as recited in claim 1 wherein each combustion chamber includes an intake valve and wherein the spark timing is intermittently advanced between the point about 10 degrees before the normal spark-timing advance and the point just after closing of the intake valve.

5. An apparatus for synchronizing a combustion chamber deposit-removing, spark-timing advance with a normal spark-timing advance in an operating, spark-ignition, internal-combustion engine during regular use, in which engine the normal spark-timing advance includes any speed or manifold pressure-dependent, spark-timing advance, comprising:
    means for selecting conditions suitable for intermittently advancing spark timing; and
    means, coupled to said means for selecting, for intermittently advancing spark timing in said combustion cycles in a given cylinder beyond the normal spark-timing advance in order to remove combustion chamber deposits, said means for intermittently advancing comprising
        a recycling timer, coupled to said means for selecting, whereby an interval of advanced spark timing is established, and
        a counter, coupled to said recycling timer and to said means for selecting, whereby the number of times spark timing is advanced within said advanced spark-timing interval in the cylinder is fixed.

6. The apparatus as recited in claim 5 wherein said means for selecting and said means for advancing are integrated on an IC chip.

* * * * *